US009110855B2

(12) United States Patent
Dziedzicki et al.

(10) Patent No.: US 9,110,855 B2
(45) Date of Patent: Aug. 18, 2015

(54) MATRIX BASED DYNAMIC PROGRAMMING

(71) Applicant: International Business Machines Corporation, Armonk, NY (US)

(72) Inventors: Tomasz Dziedzicki, Warsaw (PL); Marek Janusz Kiszkis, Warsaw (PL); Grzegorz Kokosinski, Warsaw (PL); Krzysztof Zarzycki, Warsaw (PL)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 13/690,333

(22) Filed: Nov. 30, 2012

(65) Prior Publication Data

US 2013/0159372 A1    Jun. 20, 2013

(30) Foreign Application Priority Data

Dec. 16, 2011 (EP) .................................... 11194014
Apr. 4, 2012 (EP) .................................... 12163092

(51) Int. Cl.
*G06F 7/32* (2006.01)
*G06F 17/16* (2006.01)
*G06F 17/11* (2006.01)

(52) U.S. Cl.
CPC ............... *G06F 17/16* (2013.01); *G06F 17/11* (2013.01)

(58) Field of Classification Search
CPC . G06F 17/16; G06F 15/8076; G06F 15/8092; G06F 7/4806; G06F 9/30036
USPC ....................................................... 708/520
See application file for complete search history.

(56) References Cited

U.S. PATENT DOCUMENTS 5,905,666 A * 5/1999 Hoffman et al. .............. 708/520
2010/0325187 A1   12/2010 Juffa et al.

OTHER PUBLICATIONS

Che, et al., "Dymaxion: Optimizing Memory Access Patterns for Heterogeneous Systems", Proceedings of the ACM/IEEE International Conference for High Performance Computing, Networking, Storage and Analysis, Nov. 2011, pp. 1-18.
Xiao, et al., "On the Robust Mapping of Dynamic Programming onto a Graphics Processing Unit", ICPADS 2009, 15th International Conference on Parallel and Distributed Systems, Dec. 8-11, 2009, pp. 26-33.

* cited by examiner

*Primary Examiner* — Tan V. Mai
(74) *Attorney, Agent, or Firm* — Cantor Colburn LLP

(57) ABSTRACT

Embodiments relate to dynamic programming. An aspect includes representing a dynamic programming problem as a matrix of cells, each cell representing an intermediate score to be calculated. Another aspect includes providing a mapping assigning cells of the matrix to elements of a result container data structure, and storing cells of the matrix to elements of the result container data structure in accordance with the mapping. Another aspect includes calculating intermediate scores of all cells of the matrix, whereby intermediate scores of some of the cells of the matrix are stored to a respectively assigned element of the result container data structure in accordance with the mapping. Another aspect includes during the calculation of the intermediate scores, dynamically updating the assignment of cells and elements in the mapping and assembling a final result of the dynamic programming problem from the intermediate scores stored in the result container data structure.

24 Claims, 6 Drawing Sheets

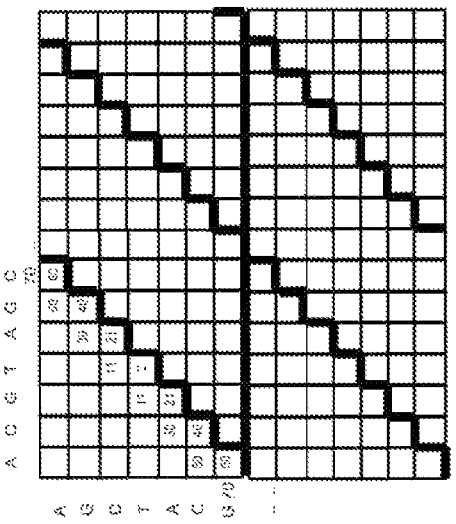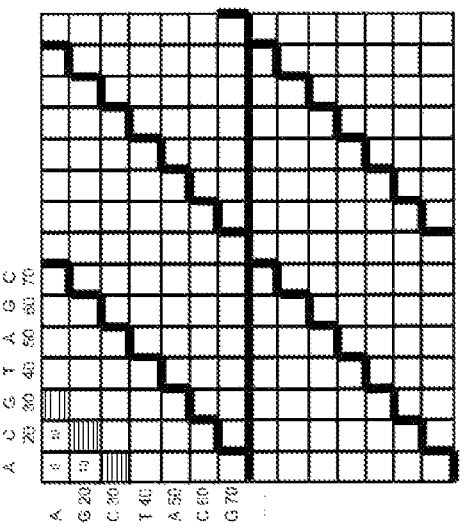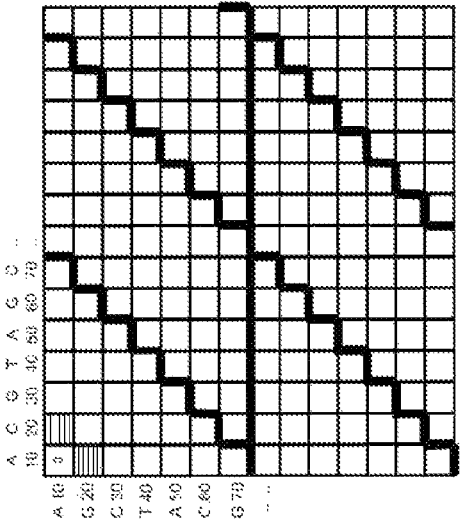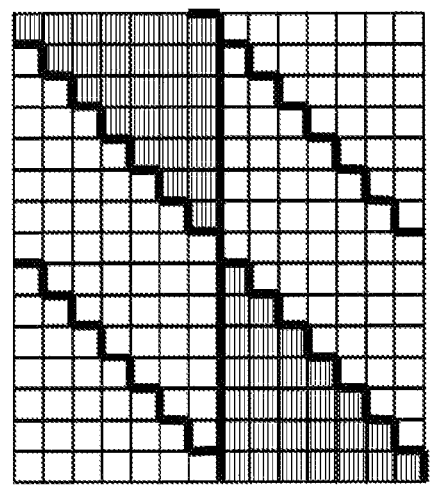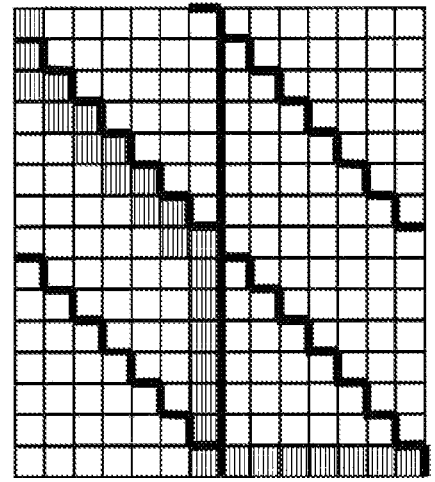

MATRIX BASED DYNAMIC PROGRAMMING

CROSS-REFERENCE TO RELATED APPLICATION

This application claims the benefit of priority under 35 U.S.C. §119 to European Application No. 11194014.4, filed on Dec. 16, 2011 and European Application No. 12163092.5, filed on Apr. 4, 2012, both of which are herein incorporated by reference in their entirety.

BACKGROUND

This disclosure relates generally to the field of data processing, and more particularly to the field of dynamic programming.

Dynamic programming is used for solving complex problems by breaking them down into simpler sub-problems. It is applicable to problems that exhibit the properties of overlapping sub-problems. The dynamic programming approach seeks to solve each sub-problem only once, thus reducing the total number of computations. Some examples of dynamic programming algorithms include the Smith Waterman algorithm and the Needleman-Wunsch algorithms. However, the complexity and the size of the data sets to be processed using dynamic programming may exceed the available hardware resources.

Some approaches to solve dynamic programming algorithms may be grouped into three categories. The first category includes central processing unit (CPU) based solutions, which may be relatively easy to implement, because a plurality of high-level programming languages such as C, C#, and Java are available for creating software applications for solving the dynamic programming algorithm. However, executing such an application on a general-purpose CPU may be relatively slow because the instruction set of the general-purpose CPU is not specially adapted for the particular requirements of dynamic processing algorithms. A second category of solutions referred as field-programmable gate array (FPGA) solutions, a special kind of processing unit is used for solving dynamic programming algorithms. The special processing units are operable to execute dynamic programming algorithms faster than general-purpose CPUs. However, only low-level programming languages may exist for the processing units, thereby making the creation and adaptation of dynamic programming algorithms highly time-consuming and difficult task. A third approach may be based on executing dynamic programming algorithms on a graphics processing unit (GPU), or a plurality of GPUs operating in parallel.

A GPU is a multiprocessor computing device capable of executing a plurality of threads in parallel. A GPU is specialized for computationally intensive, highly parallel computation, and may be used for graphics rendering or other highly parallelizable computation tasks. The GPU may act as a coprocessor to the main CPU in a computing system, thereby allowing off-loading data-parallel, compute-intensive portions of applications running on the main CPU onto the GPU. A processing unit of the GPU may include a stream multiprocessor. GPUs have several memory units which may have different functions. Some of these memory units may be used as a shared memory of the GPU, herein also referred to as local memory, as said memory is accessible (shared) by a group of threads running on the GPU. A thread as used herein refers to a thread of execution in a program function, and a group of threads or thread block as used herein refers to a batch of threads that can cooperate together by effectively sharing data through some shared memory, preferentially a fast memory, and that can synchronize their execution to coordinate memory access. In addition, a GPU may comprise one or more global memories that are accessible by each of the stream multiprocessors; however accessing the global memories may have slower performance as compared to accessing the shared memory.

SUMMARY

Embodiments include a method, system, and computer program product for solving a dynamic programming problem. An aspect includes representing the dynamic programming problem as a matrix F of cells, each cell representing an intermediate score to be calculated, the matrix having a form: $F(i,j)=G(F(i-1, j-1), F(i, j-1), F(i-1, j), c(i,j))$, wherein i is a row index of the matrix F, wherein j is a column index of the matrix F, i and j respectively being larger than or equal to 0, wherein G is an optimization function and c is a cost function. Another aspect includes providing a mapping, the mapping assigning cells of the matrix to elements of a result container data structure. Another aspect includes providing the result container data structure for storing cells of the matrix F to elements of the result container data structure in accordance with the mapping. Another aspect includes calculating intermediate scores of all cells $F(i,j)$ of the matrix, whereby intermediate scores of some of the cells of the matrix are stored to a respectively assigned element of the result container data structure in accordance with the mapping. Another aspect includes during the calculation of the intermediate scores, dynamically updating the assignment of cells and elements in the mapping such that: that first ones of the cells of the matrix are assigned to elements of the result container data structure respectively not having stored any intermediate score or having stored an intermediate score of second ones of the cells of the matrix, the first cells being calculated at a later moment in time than the second cells; that any intermediate scores of the second cells being overwritten by the intermediate scores of the first cells will not be required as input by any other ones of the matrix cells not having been calculated yet, wherein the number of elements of the data structure is smaller than the number of cells of the matrix. Yet another aspect includes assembling a final result of the dynamic programming problem from the intermediate scores stored in the result container data structure.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 7a, FIG. 7b, and FIG. 7c illustrate an embodiment of calculation of intermediate scores in a start cell group; and FIG. 8a, FIG. 8b, and FIG. 8c illustrate an embodiment of migration of parts of the horizon spanning multiple cell groups.

DETAILED DESCRIPTION

Figure 1:
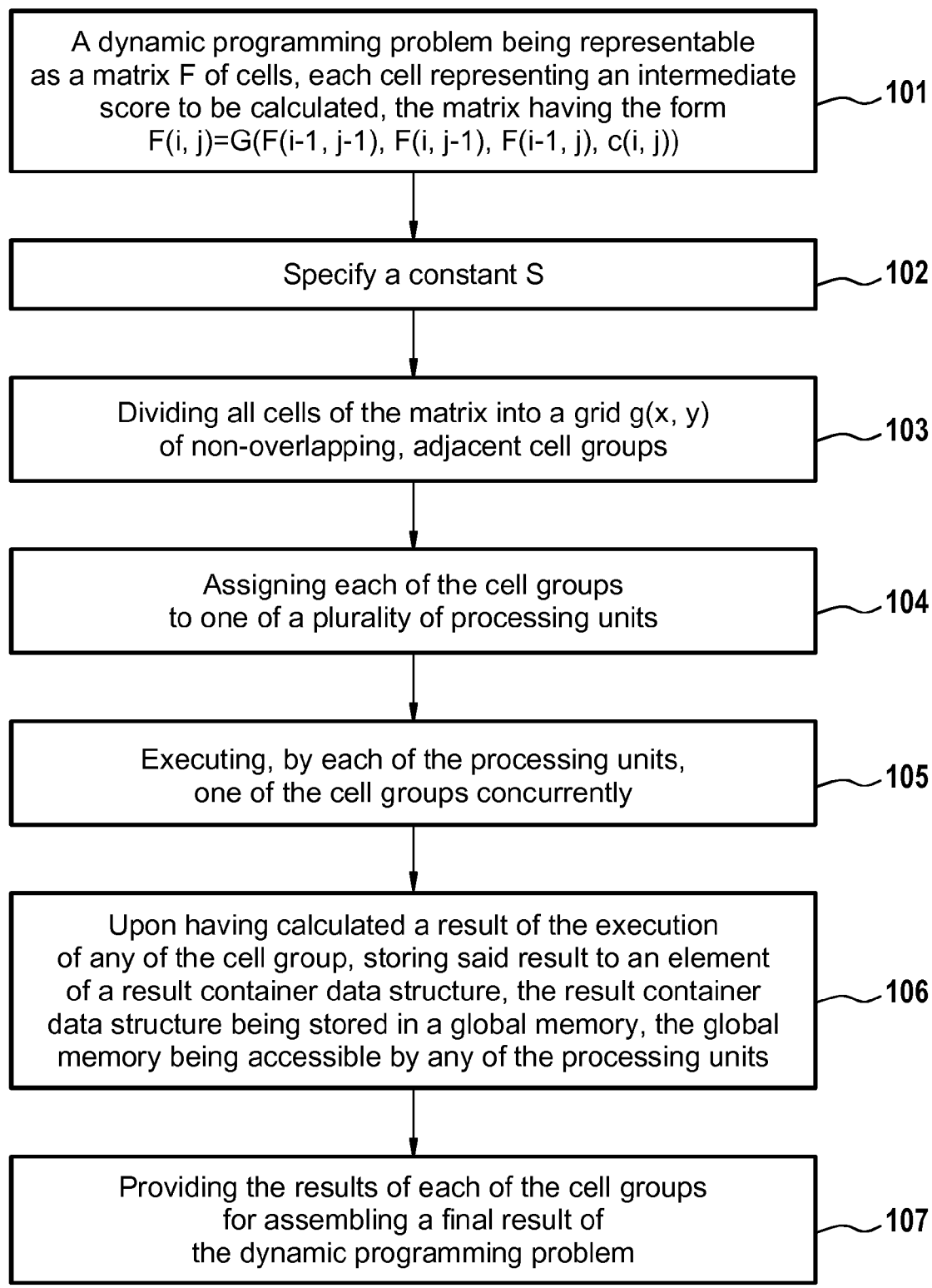
FIG. 1 is a flowchart of an embodiment of a method for matrix-based dynamic programming.

Embodiments of matrix-based dynamic programming are provided, with exemplary embodiments being discussed below in detail. A dynamic programming problem may be represented as a matrix F of cells. Each cell represents an intermediate score to be calculated. The matrix has the form F(i,j)=G(F(i−1, j−1), F(i, j−1), F(i−1, j), c(i,j)), wherein i is a row index of the matrix F, wherein j is a column index of the matrix F, i and j respectively being larger than or equal to 0. G is an optimization function and c is a cost function. A mapping is provided, the mapping assigning cells of the matrix to elements of a result container data structure h, and the result container data structure for storing cells of the matrix F to elements of the result container data structure in accordance with the mapping is also provided. Intermediate scores of all cells F(i,j) of the matrix are then calculated, whereby intermediate scores of some of the cells of the matrix are stored to a respectively assigned element of the result container data structure in accordance with the mapping, and during the calculation of the intermediate scores, the assignment of cells and elements in the mapping are dynamically updated such that: that first ones of the cells of the matrix are assigned to elements of the result container data structure respectively not having stored any intermediate score or having stored an intermediate score of second ones of the cells of the matrix, the first cells being calculated at a later moment in time than the second cells; that any intermediate scores of the second cells being overwritten by the intermediate scores of the first cells will not be required as input by any other ones of the matrix cells not having been calculated yet; and wherein the number of elements of the data structure is smaller than the number of cells of the matrix. A final result of the dynamic programming problem is then assembled from the intermediate scores stored in the result container data structure The mapping of a sub-set of cells to a number of elements of a data structure according to a dynamically updatable assignment allows re-using storage space by overwriting intermediate scores of the dynamic programming problem not being required any more for calculating further intermediate scores. Thus, a data structure being significantly smaller than the storage space required for storing all intermediate results of all cells of the matrix may suffice for solving the dynamic programming problem. According to some embodiments, all cells of the matrix are mapped exactly one time to an element of the result container data structure during execution of the dynamic programming algorithm. According to some embodiments, the result container data structure is initialized by storing in the result container data structure intermediate scores of the cells of the uppermost row and of the leftmost column of the matrix.

According to further embodiments, the dynamic programming problem may be represented as a matrix F of cells, each cell representing an intermediate score to be calculated. The matrix has the form F(i,j)=G(F(i−1, j−1), F(i, j−1), F(i−1, j), c(i,j)), wherein i is a row index of the matrix F, wherein j is a column index of the matrix F, i and j respectively being larger than or equal to 0, wherein the row index is incremented from top to bottom of the matrix and wherein the column index is incremented from the left to the right side of the matrix, wherein G is an optimization function and wherein c is a cost function. A constant S may be specified, and all of the cells of the matrix may be divided into a grid g(y, x) of non-overlapping, adjacent cell groups, wherein each cell group g(y,x) comprises a left upper starting cell F(i,j). The cells are specified by a) selecting a cell F(i,j) of the matrix as the left upper starting cell of said cell group; b) selecting all cells of row i lying within the matrix and having a column index j within the range [j−a+0, j−a +1, . . . , j−a+(S−1)] to get S cells, wherein a=0; repeating block b), wherein in each repeat the row index i is incremented by 1 and wherein a is incremented by 1, said repeat being executed until a is equal to S−1, thereby selecting S cells in each of S rows for said cell group altogether; wherein the left upper starting cell of at least one of the cell groups has row index i=0 and column index j=0, and wherein each of the matrix cells belongs to exactly one cell group of the grid of cell groups. Each of the cell groups are then assigned to one of a plurality of processing units. Each of the processing units executes one of the cell groups concurrently, thereby filling each cell of said cell group with a calculated intermediate score, wherein the execution of the plurality of cell groups is coordinated in a way ensuring that the execution of any of the cell groups is started only in case an execution of an adjacent left cell group and an adjacent upper cell group is already finished or if said adjacent left cell group or adjacent upper cell group does not exist. Upon having calculated a result of the execution of any one of the cell groups, the result is stored to a result container data structure, the result container data structure being stored in a global memory, the global memory being accessible by any one of the processing units; and the results of each of the cell groups are provided for assembling a final result of the dynamic programming problem. The grouping of cells into groups of cells as specified above may return diamond-shaped cell groups being particularly adapted for a parallel execution of multiple cell groups on multiple different processing units.

Dynamic programming formulas and corresponding dynamic programming matrices of the form F(i,j)=G(F(i−1, j−1), F(i,j−1),F(i−1, j), c(i,j)) may be used for aligning data patterns of various kinds, in particular for aligning text and DNA sequences and/or for finding the longest common subsequences in strings. Thus, in some embodiments a an efficient method of aligning huge amounts of DNA or text sequences is provided, as for example, for whole genome alignments having been derived from a plurality of organisms for inter- and intra-species DNA sequence alignments. For example, a first symbol sequence s of length N may be aligned to a second symbol sequence t of length M. An alignment matrix F (i,j) for this problem may have the dimension N×M, wherein the column index j of said matrix represents the individual symbols of the second sequence t and wherein the row index i represents the symbols of the first sequence s. An intermediate score as used herein is an intermediate result of the dynamic programming problem calculated for a particular one of the matrix cells according to the above formula F(i,j) =[. . . ].

According to some embodiments, calculating the dynamic programming problem comprises: dividing all cells of the matrix into cell groups; executing, by each of a plurality of processing units, one of the cell groups concurrently, thereby filling each cell of said cell group with a calculated intermediate score, wherein for execution of each of the cell groups intermediate scores stored in specific elements of the result container data structure are read and used as input; wherein the execution of the cell groups is coordinated in a way ensuring that the execution of any of the cell groups is started only in case an execution of an adjacent left cell group and an adjacent upper cell group is already finished or if said adjacent left cell group or adjacent upper cell group does not exist; upon having calculated a result of the execution of any of the cell groups, storing said result to the specific elements of the result container data structure from which the input for said cell group was read, the result container data structure being stored in a global memory, the global memory being accessible by any one of the processing units; and providing the results of each of the cell groups for assembling the final result of the dynamic programming problem.

According to embodiments, the result container data structure is a memory structure having a size being proportional to a sum of the number of columns and the number of rows in the matrix F. According to some embodiments, the elements of the result container data structure are identified by at least one index. According to embodiments, the result container data structure is an array. According to some embodiments, the result container data structure comprises N+M−1 elements, wherein N is the number of rows of the matrix, wherein M is the number of columns of the matrix. According to further embodiments, each of the elements is invariantly mapped to one of one or more cell diagonals spanning the matrix F. Each cell diagonal is a set of one or more matrix cells, wherein all cells of said cell diagonal fulfill an equation i−j=constant, said constant being particular for said cell diagonal. By repeatedly updating the assignment of cells and elements in the mapping, all cells of a cell diagonal are consecutively mapped to the same element of the result container data structure.

According to embodiments, intermediate scores of all cells in a current set of horizon cells are stored in the result container data structure. The current set of horizon cells is defined as a set of neighboring cells of matrix F meeting the following conditions: the upper-right corner and the lower-left corner of the matrix are included; intermediate scores have been calculated for the current set of horizon cells, for all cells of the matrix F having a lower or equal row index value and/or a lower or equal column index value than any cell of the current set of horizon of cells; and intermediate scores have not yet been calculated for the lower right cell of each horizon cell.

A current set of 'horizon cells' may also be referred to as a current 'horizon'. According to some embodiments, cells $F(i,j)$ of the matrix F are stored in the result container data structure in the following manner: h [i−j]=F(i,j), wherein h [i−j] is mapped to exactly one cell diagonal covering at least the cell $F(i,j)$. According to some embodiments, the row index is incremented from top to bottom of the matrix and the column index is incremented from the left to the right side of the matrix. The cell groups consist of a grid g(y, x) of non-overlapping, adjacent cell groups, wherein each cell group g(y,x) comprises a left upper starting cell $F(i,j)$.

For a specified constant S, each of the cell groups is specifiable by: selecting a cell $F(i,j)$ of the matrix as the left upper starting cell of said cell group; selecting all cells of row i lying within the matrix and having a column index j within the range [j−a+0, j−a+1, . . . , j−a+(S−1)] to get S cells, wherein a=0; repeating block b), wherein in each repeat the row index i is incremented by 1 and wherein a is incremented by 1, said repeat being executed until a is equal to S−1, thereby selecting S cells in each of S rows for said cell group altogether; wherein the left upper starting cell of at least one of the cell groups has row index i=0 and column index j=0, and wherein each of the matrix cells belongs to exactly one cell group of the grid of cell groups; and wherein each of the cell groups is assigned to one of the plurality of processing units. The execution of the blocks a) to c) comprises a mathematical description of the result of the grouping of the cells, and is not a specification of chronological execution. Any other procedure resulting in the same cell grouping shall also be considered as being subsumed under the blocks a) to c). Upon executing blocks a) to c), the matrix of cells is divided into a plurality of "diamond shaped" cell groups and some "start"- and "end"-cell groups for assigning the execution of the cells of each cell group to one of the processing units. Each cell group within the grid g(y,x) of non-overlapping, adjacent cell groups is identifiable via a cell group row index y and a cell group column index x. Cells can, evidently, only be selected if they exist, i.e., if they are part of the matrix. Thus, in case the current row or column index specify for a cell lying outside the matrix, no cell can be selected. In effect, each row of cell groups comprises a "start" cell group and an "end" cell group at the left and right border of the matrix respectively which are not "diamond-shaped" but "triangle-shaped". The "diagonal shape" of the vast majority of the cell groups of the matrix is advantageous as it allows for a higher degree of parallelization than, for example, could be reached by a division of the matrix into square-shaped cell groups. In a further advantageous aspect, the grouping of cells into said cell groups for distributing said cell group for execution to different processing units for parallel execution is advantageous as said features, in combination with the usage of a global memory for storing the results of the cell groups allows for a—to a large extent—parallel processing of the cell groups.

The expression "execution of a cell $F(i,j)$", as used herein means calculating the intermediate score for said cell using the intermediate score of the upper, upper-left and left neighbor cells of said cell as input according to the function G(F(i−1,j−1), F(i,j−1),F(i−1,j), c(i,j)). The optimizing function G can be, for example, a minimizing or maximizing function. Providing the results of each of the cell groups allows assembling a final result of the dynamic programming problem, e.g. an optimum alignment of two symbol sequences.

According to some embodiments, the assigning each of the cell groups to one of a plurality of processing units comprises evaluating if said cell group is ready for execution (as all intermediate scores required as input are already available) and assigning a cell group to one of the processing units only in case it was determined that said cell group is ready for execution. According to some embodiments, assigning each of the cell groups ready for execution to one of a plurality of processing units, executing, by each of the processing units, said assigned cell group and storing the result of the execution of any of the cell groups is repeated until all cell groups of the matrix have been executed. The results of all cell groups are used for assembling the final result of the dynamic programming problem. According to some embodiments, the above-described operations may be encoded in the form of a high-level programming language such as, for example, Java, C, C#, C++ or the like. This may ease the specification and modification of the dynamic programming problem and its integration into existing applications.

In a further aspect, it is not necessary to store the whole matrix in the local memories of the processing units. Instead, it may be possible to store all the results of the cell groups in a result container data structure being of linear size. According to some embodiments, the result container data structure is stored in the global memory and a sub-structure of this result container data structure is stored in each of the local memories, whereby each of said sub-structures is used for storing the result of a cell group currently executed by the corresponding processing unit.

According to some embodiments, the result container data structure is an array h of length N+M+1, wherein N is the length of a first symbol sequence, and wherein M is the length of a second symbol sequence. An 'array' as used herein is any data structure consisting of a collection of elements identified by at least one index. An 'array' as used herein shall subsume also data structures such as tables, hash tables, search trees, lists, vectors (a vector is a data structure whose length may be modifiable at runtime) and related data structures provided by many higher level programming languages. According to preferred embodiments, the data content of the elements of an array are stored in a way on a storage device that the content of adjacent array elements are stored on adjacent locations on the storage medium, thereby increasing the speed of read and/or write operations on adjacent array elements.

The symbols of the first sequence may be identified by the row index i, the symbols of the second sequence may be identified by the column index j. According to embodiments, the intermediate scores generated per cell $F(i,j)$ are stored in the result container data structure array at array element index i-j, i.e., in $h[i-i]$. Thereby, "i-j" is an indication of the one cell diagonal covering, among others, cell $F(i,j)$. The left neighbor cell $F(i,j-1)$ is mapped to $h[i-(j-1)]$, the upper neighbor cell $F(i-1,j)$ is mapped to $h[(i-1)-j]$. The left upper neighbor cell $F(i-1,j-1)$ and the cell $F(i,j)$ are both mapped to $h[i-j]$ as both cells belong to the same cell diagonal. Thus, the dynamic programming function becomes: $h[i-j]*32\ G(h[i-(j-1)], h[i-(j+1)], h[i-j]**, c(i,j))$. Thereby, $h[i-j]*$ refers to an intermediate value of a horizon cell to be calculated and $h[i-j]**$ refers to an intermediate value having been calculated in a previous calculation block and being currently stored in array element $h[i-i]$ until it is overwritten by the new value $h[i-i]*$ to be calculated. It is appreciated that the same concept can be expressed also using slightly differing formulas, for example, $h[i-i]=F(i,j+1)$.

According to some embodiments, the memory blocks that store the data content of a first array element of said array lie adjacent to the memory blocks that store the data of the two adjacent array elements. Thus, the array cells that store the input data (i.e., the intermediate scores) required to calculate the intermediate score of a given cell are at most 1 cell apart from the cell being computed and allow relatively fast retrieval of the input data, providing for a good access locality (the information required is stored in a sequence of adjacent memory blocks), and a data structure of linear size is sufficient to dynamically store the currently available "horizon". According to some embodiments, each processing unit currently executing one of the cell groups may copy the input required for execution of said cell group into its local memory; this may be done by accessing the result container data structure h for reading the required intermediate scores as input data in the following way: The currently executed cell group may have an upper right corner cell $F(u,v)$. Said cell $F(u,v)$ belongs to a cell diagonal mapped to $h[u-v]$. In order to calculate a result, the intermediate score of cell $F(u-1,v)$ stored in array cell $h[u-v-1]$, the intermediate score of cell $F(u,v-1)$ stored in array cell $h[u-v+1]$ and the intermediate score of cell $F(u-1,v-1)$ stored in array cell $h[u-v]$ may be used as input and the calculated result is written to array cell $h[u-v]$, thereby overwriting one of its input values which is no longer needed.

The "horizon" is a set of array elements of dimension M+N+1 being mapped to a dynamically changing set of cells of the matrix F which represent the "current state" of the dynamic programming function, i.e., represent the "border of knowledge" in the form of left-most and bottom-most cells of said matrix for which an intermediate score has already been calculated. As the calculation of each cell requires the intermediate score of its left, upper, and left-upper neighbor as input, the horizon also provides the input data for all cells ready for calculation in a next calculation block. The horizon comprises a sequence of neighboring cells of the matrix F (vertical, horizontal and diagonal neighbors) for which the following conditions hold true, assuming the left-most and upper-most cell of the matrix has the lowest row and column index: the intermediate score for said horizon cells and for all cells in the matrix having a lower or equal row index value and/or having a lower or equal column index value have already been calculated; and at least the cell having a higher row index and having a higher column index has not yet been calculated; i.e., if $F(i,j)$ is a horizon cell, then at least $F(i+1, j+1)$ has not been calculated yet, but all cells having a row index $\leq i$ or have a column index $\leq j$ have already been calculated.

Thus, at the beginning of executing the dynamic programming function, the horizon covers all cells having a row index $i=0$ and an arbitrary column index $j \in [0, \ldots, M-1]$ and all cells having a column index $j=0$ and an arbitrary row index $i \in [0, \ldots, N-1]$. At the end of executing the dynamic programming function, the horizon covers all cells having a row index $i=N-1$ and an arbitrary column index $j \in [0, \ldots, M-1]$ and all cells having a column index $j=M-1$ and an arbitrary row index $i \in [0, \ldots, N-1]$. At any point in time during the calculation, the horizon will comprise the upper-right corner cell and the lower-left corner cell. This ensures that all data dependencies (resulting from using the intermediate scores of the three left, upper-left and upper cells as input by each of the cells) are met. Thus, the result container data structure comprising, at any current time during the calculation, only the intermediate scores of the cells in the current set of horizon cells, comprises at any moment during calculation only this particular subset of intermediate scores which is required as input by the cells to be executed in the succeeding future block.

According to some embodiments, the horizon is moved from the left upper corner of the matrix to the right lower corner of the matrix in a block-wise fashion. The horizon may be shifted in each block one or more cells to the right and one or more cells to the bottom of the matrix. This shifting of the horizon is executed for each of the cell groups being concurrently executed by the processing units in parallel. Upon termination of the calculation of a cell group, only the result of said cell group, not the intermediate scores of all cells in said cell group, is stored in corresponding elements of the result container data structure. This reduces the input/output (I/O) load of the global memory. Various embodiments thus allow to make use of a result container of linear size N+M-1 for aligning two sequences of respective sizes N, M, also the combinatorial space for the alignment is of dimension N*M. Thus, the memory consumption is significantly reduced and highly complex alignment operations can be executed even on hardware resources having local memories and a global memory of comparatively small size.

According to some embodiments, executing one of the cell groups comprises assigning each cell of said cell group to one thread to be executed by the processing unit having assigned said cell group. Each thread assigned to a cell may calculate the intermediate score of said cell. All threads executed by said processing unit are operable to access a local memory assigned to said processing unit. One of the cells of said cell group is then executed by each of the threads, wherein the execution of the plurality of cells in each cell group is coordinated in a way ensuring that the execution of any of the cells is started only in case an execution of an adjacent left cell, an adjacent left-upper cell and an adjacent upper cell is already finished or if said adjacent left cell, adjacent left-upper cell or adjacent upper cell lies outside the matrix. Upon having calculated a result of the execution of any of the cells of said cell group, the result is stored as the intermediate score of said cell to the local memory of said processing unit. A fine-grained degree of parallelization is thereby provided, as different cell groups are assigned to different processing units (first level of parallelization), and different cells within a particular cell group are assigned to different threads to be executed by the processing unit having assigned said cell group.

According to some embodiments, the threads work as follows: some or all cells belonging to a cell-antidiagonal of a currently executed cell block are executed by all the threads in parallel. An anti-diagonal is a set of cells which can be specified by the following construction pattern: given a row index r and a column index c, a cell anti-diagonal is a set of cells of the matrix F comprising: $\{\ldots, F(r+2, c-2), F(r+1, c-1), F(r, c), F(r-1, c+1), F(r-2, c+2), \ldots\}$. After having executed all cells of a cell anti-diagonal in parallel by the threads the threads are synchronized. The synchronization may be effected by a barrier implemented in an execution loop for executing all threads of a cell group. Once all the threads pass through said barrier, the information that all the cells within an antidiagonal of a previous calculation block have already been calculated and that the input required by all concurrently executed threads of a current antidiagonal is implicitly given.

According to some embodiments, synchronization points may be specified in computer-implemented instructions executing the dynamic programming function. Threads in a thread block are suspended until they all reach the synchronization point of a kernel. Each thread in a thread block may be identified by its thread ID, which may be the thread number within the thread block (or a combination of thread ID and block ID) and allows the addressing of the thread by an application. Alternatively, each thread may be addressed via a thread-ID consisting of a two-or three-component index (for two-dimensional and three-dimensional thread blocks respectively) within a particular thread block. A thread block may contain limited maximum number of threads in some embodiments.

According to some embodiments, executing the cells in a cell group means computing all the intermediate scores of all the cells within that group, initially knowing only the values on the left and top border of said cell group. When the execution of the cell group is finished, only some selected ones of the calculated intermediate scores are stored back to the result container data structure, thereby moving a part of the horizon corresponding to said cell group towards the lower right corner. Those selected intermediate scores are exactly the ones still in the local memory. All previously calculated intermediate scores were overwritten. The selected cells whose intermediate scores are collectively considered as the result of the execution of the cell group are the cells constituting the lowest row of the cell group and the two rightmost cells in each row of said cell group, except for "end" cell groups where it is only the lowest row and the rightmost column. As the result container data structure is not updated upon each and every calculation of an intermediate scores of a single cell, but rather is only updated when one of the cell groups has finished execution, the I/O load of the global memory and the data traffic between the individual processing units and the processing unit managing the global memory is significantly reduced.

According to some embodiments, each of the multiple processing units is a stream multiprocessor of a GPU comprising a global memory, wherein each of the local memories is a shared memory unit of one of the stream multiprocessors, and wherein the threads to be executed by the same processing unit share the same one shared memory units. Embodiments of the invention making use of GPU's stream multiprocessors of graphical processing units allow making use of the parallel capabilities already provided by standard graphic cards. By distributing the execution of the cell groups to different processing units of a GPU by means of an application program comprising, for example, some instructions interpretable by said GPU for determining its process flow, it is possible to make use of standard (and relatively cheap) graphic cards to parallelize the execution of the dynamic programming function. According to some embodiments, the GPU may be designed in accordance with a Compute Unified Device Architecture (CUDA). A CUDA software stack is composed of several layers, in particular a hardware driver, an application programming interface (API) and its runtime and to higher-level mathematical libraries of common usage. Thus, it is no longer necessary to customize the processing architecture of the GPU or to encode the dynamic programming algorithm in a low-level programming language particular to the respective graphic card in order to increase the performance of the execution of the dynamic programming algorithm.

In some GPUs, each of a grid of thread blocks, also referred to as 'batch' or 'queue' of thread blocks executed in said GPU, shares the same dimensionality and size and belongs to the same kernel. A 'kernel' is a function that has been compiled to an instruction set of the GPU. In multi-threaded GPUs, multiple threads may be executed in parallel. A kernel may include a batch of threads, the batch of threads being organized as a grid of thread blocks. Thus, upon invoking a single kernel, the parallel execution of a plurality of threads being contained in a grid of one or more thread blocks can be initiated. Threads in different thread blocks can communicate and synchronize with each other only via the global memory (which is slow). According to some embodiments, each of the cell groups ready for execution is mapped to a thread block of the GPU for executing each of the cells of said cell group by one thread of said thread block. A GPU may run all the thread blocks of a particular grid sequentially if it has relatively few parallel capabilities or in parallel if it has greater parallel capabilities. According to some embodiments, a grid of thread blocks is executed on the GPU by executing one or more blocks on each multiprocessor.

According to other, non-GPU based embodiments, each of the processing units is a processor of a client computer system. According to preferred embodiments, the processor of at least some of the client computer systems is a multi-core processor. Each of the client computer systems is connected to a central server. The connection may be based on a network connection such as the Internet or an intranet. Each client computer system comprises one of said local memory units, e.g. the main memory or a hard disk memory of the client device. The central server comprises the global memory, the global memory being accessible by any of said client computer systems. The threads to be executed by the same processing unit are threads to be executed by one of the client computer systems. The threads of each of said client computer systems are operable to access the local memory of said client computer system. According to preferred embodiments, the threads to be executed by each of the client computer systems are executed in parallel by the individual nodes of the multiprocessor of said client computer system.

According to some embodiments, the dynamic programming problem relates to the alignment of a first sequence of symbols s and a second sequence of symbols t. According to embodiments, the dynamic programming problem can be, for example, a Levenshtein distance algorithm or a Needleman Wunsch algorithm. A Levenshtein distance algorithm is defined by:

$$c(i, j) = \begin{bmatrix} 0 & \text{if } s[i] = t[j] \\ 1 & \text{otherwise,} \end{bmatrix} \quad \text{(EQ. 1),}$$

and wherein:

$$G(F(i-1,j-1),F(i,j-1),F(i-1,j),c(i,j))=\min(F(i-1,j-1)+ P,F(i,j-1)+GP,F(i-1,j)+GP) \quad \text{(EQ.2),}$$

wherein $P=c(i,j)$ and wherein P is a predefined penalty value and GP is a predefined gap penalty function, which may be 10 in some embodiments. A Needleman-Wunsch algorithm is defined with linear gap penalty, wherein:

$$c(i, j) = \begin{bmatrix} +1 & \text{if } s[i] = t[j] \\ -1 & \text{otherwise,} \end{bmatrix} \quad \text{(EQ. 3),}$$

and wherein:

$$G(F(i-1,j-1),F(i,j-1),F(i-1,j),c(i,j))=\max(F(i-1,j-1)+ P,F(i,j-1)+GP,F(i-1,j)+GP) \quad \text{(EQ. 4),}$$

wherein $P=c(i,j)$ and wherein P is a predefined penalty function and GP is a predefined gap penalty value, which may be 10 in some embodiments. An algorithm for determining a longest common subsequence of the first and second sequences of symbols is also defined, wherein:

$$c(i, j) = \begin{bmatrix} +1 & \text{if } s[i] = t[j] \\ -1 & \text{otherwise,} \end{bmatrix} \quad \text{(EQ. 5),}$$

and wherein:

$$G(F(i-1,j-1),F(i,j-1),F(i-1,j),c(i,j))=\max(F(i-1,j-1)+ E,F(i,j-1),F(i-1,j)) \quad \text{(EQ. 6),}$$

wherein $E=c(i,j)$ and wherein E is a predefined scoring function for extending a common subsequence of the first and second sequences of symbols.

According to some embodiments, the dynamic programming problem relates to the alignment of a first sequence of symbols s and a second sequence of symbols t, the first sequence being of length N, the second sequence being of length M, wherein S is a number smaller or equal than N and wherein S is a number smaller or equal than M. According to come embodiments, the alignment comprises: determining if the length N is dividable by S without leaving a reminder; if N is not dividable, adding as many of a fill-symbol at the end of the first sequence as necessary in order to make the length N' of the first sequence dividable by S; determining if the length M is dividable by S without leaving a reminder; if M is not dividable, adding as many of a fill-symbol at the end of the second sequence as necessary in order to make the length M' of the second sequence dividable by S; specifying one or more alignment scores to be returned as a result of the cost function c(i,j) when aligning a first symbol s[i] and a second symbol t[j], said alignment scores being chosen such that the final result is guaranteed to comprise an alignment of the first and the second sequence having none of the fill-symbols aligned with one of the other symbols. Said features may be advantageous as they allow applying embodiments of the invention also on symbol sequences whose original length do not allow specifying a matrix which can be divided into diamond-shaped cell groups. The fill-symbol may be any kind of symbol, e.g., a hash sign #, which is not an element of the first or the second symbol sequence to be evaluated.

According to some embodiments, the match cost concerning an alignment of two fill-symbols to each other is selected to be 0 and the costs for aligning a 'normal' sequence symbol with the fill symbol is selected to be ∞ (infinite). In case the individual alignment scores are calculated using a positive scoring function, the 'score' for aligning a 'normal' sequence symbol with the fill symbol is accordingly selected to be −∞. This allows a good alignment to be calculated as the final result given the first input sequence s and the second input sequence t will go through the cell F(N−1, M−1), because any other alignment path would require at least one substitution of the fill-symbol # for another character, thereby causing infinite alignment costs for this pair of symbols.

According to some embodiments, the coordination of the execution of the cell groups comprises: adding the top- and left-most cell group to a first-in-first-out (FIFO) queue; executing at least the top- and left-most cell group; monitoring, while any of the cell groups is executed, which one of the cell groups is ready for starting the execution, wherein a cell group is ready for execution if said cell group has not been executed yet and if in addition the execution of the adjacent left cell group and the adjacent upper cell group is already finished or if said adjacent left cell group or adjacent upper cell group does not exist; and upon determining that any of the cell groups is ready for execution, adding said cell group to the FIFO queue.

According to some embodiments, the execution of the cell groups comprises: determining the number of processing units; determining a sub-set of cell groups in the FIFO queue which are to be executed next, said sub-set comprising as many cell groups as the number of processing units or, if the number of cell groups ready to be started execution lies below the number of processing units, comprising all of the cell groups ready to be executed; storing a copy of said sub-set of cell groups into the global memory; copying each of the cell groups in said sub-set from the global memory into the local memory of one of the processing units for parallel execution of all cell groups of said sub-set. Said features may be advantageous as they guarantee that the execution of the cell groups can be allocated to different processing units in a way making use of the parallel capabilities of the respectively used hardware infrastructure.

According to further embodiments, a local memory size may be determined, the local memory size being the minimum size of any of the local memories. The local memory size may then be divided by 3 times (triple) the cell memory size for obtaining a division result, wherein a cell memory size is the memory size required for storing one of the intermediate scores. The division result is then rounded down to the nearest whole value and using said value as S. The factor "3" results from the fact that the cell group uses a fragment of horizon comprising 3*S cells as input for calculating new intermediate scores, thereby moving said horizon fragment in the direction of the right lower corner. This allows selection of S as being as big as possible given a particular hardware environment. S specifies how many cells are contained in each row of a cell group (except from the "start" and "end" cell groups) and also specifies how many rows each cell group covers. The bigger S is selected, the larger the cell groups and the less often data (the results of executing a cell group) needs to be copied from the processing units executing the cell group to the respective elements of the results container data structure stored in the global memory. In addition, and inherently to the shape of each cell group, S corresponds to the number of cells within said cell group which can be executed in parallel provided the processing unit to which said cell group was assigned supports the parallel processing of said cells, e.g. in the form of concurrently executed threads. Thus, the bigger S, the less data traffic is caused, and/or the higher the number of cells and corresponding threads which can be executed in parallel. Thus, S can be chosen in a way to optimally adapt the speed and parallelizability of the dynamic programming function to the given hardware capabilities, in particular the size of the available local memories available.

According to some embodiments, the result container data structure having stored the intermediate scores of the cells of the horizon is stored on the global memory of the GPU. According to other embodiments (GPU-based or CPU based embodiments), it is stored in a memory unit of the CPU. According to some embodiments, S is selected as high as possible but not larger than the length N,M of any one of the symbol sequences s,t to be aligned by said dynamic programming function. Depending on the embodiment and on the data type used for storing the intermediate score, the cell memory size may be of the size of an Integer, a Long, a Float, or the like.

According to some embodiments, a minimum required local memory size is calculated as the product of the cell memory size and the factor 3*S. For example, in case the intermediate scores are stored as Integers in the local memories of the processing units, the minimum required local memory size would be 3*(size of an Integer)*S. Thus, it can be determined in advance if a particular hardware environment, e.g. the size of the local memories available in a processing system, is operable to support the parallel execution of cell groups comprising S*S cells.

According to embodiments, the result container data structure is an array of length N+M+1, wherein N is the number of rows in the matrix and M is the number of columns in the matrix. The matrix includes a plurality of cell diagonals. Each cell diagonal includes a starting cell (the starting cell of a cell diagonal has nothing to do with the left upper starting cell of the cell groups mentioned above). The starting cell of a cell diagonal is either a cell at the left border of the matrix, a cell at the top border of the matrix or the left-top corner cell of the matrix. For all cells within any one of said cell diagonals the following expression holds true: i−i=d, wherein i is a row index, wherein j is a column index and wherein d is a constant being specific for the dth diagonal of the cell matrix. This expression shall be considered as a way of defining a "cell diagonal" within the meaning of this invention, i.e. a set of cells in the matrix forming a diagonal line. In other words, all cells within one cell diagonal are specifiable by the blocks of: d) incrementing the row index and the column index of a cell diagonal's starting cell respectively by 1, and e) repeating block d) until the lower border or the right border of the matrix is reached. According to some embodiments each of the cell diagonals has an assigned array element in the result container data structure array. This assignment is fixed and not altered during the execution of the dynamic programming algorithm.

For each of the cell groups having finished execution, all intermediate scores that are calculated for any of the following set of cells may be collected: all cells of the lower-most row of said cell group; the two cells in each row of said cell group having the highest column index. For each cell of said set of cells, one cell diagonal may be identified, said cell diagonal comprising said cell, and the intermediate scores collected from said set of cells may be used as the result of the execution of said cell group. According to some embodiments each of the elements of the array has assigned one of the cell diagonals. After having collected the intermediate scores of said set of cells, the method may comprise storing each collected intermediate score in one of the elements assigned to the cell diagonal identified to comprise said cell. Thereby, an already stored intermediate score may be overwritten.

The intermediate scores collected from the set of cells specified above (and not the totality of the cells of the cell group) are selectively used as the result of the execution of said cell group. Assigning cell diagonals to a particular element of the array corresponding to one particular cell diagonal may be advantageous, as the intermediate score stored in a particular array element for said cell diagonal is overwritten whenever a new cell group also covering said cell diagonal finishes execution. Thus, the same storage space may be re-used and can be updated with more current values, thus minimizing the size of the global memory occupied by the result container data structure.

According to some embodiments, upon starting the execution of a current one of the cell groups, first intermediate scores calculated for the collected cells of a left-adjacent cell group of said current cell group are read, the first intermediate scores being read from the corresponding elements of the array. Second intermediate scores calculated for the collected cells of an upper-adjacent cell group of said current cell group may also be read, the second intermediate scores being read from the corresponding elements of the array. Third intermediate scores calculated for the collected cells of an upper-left-adjacent cell group of said current cell group may also be read, the third intermediate scores being read from the corresponding elements of the array. The first, second and third intermediate scores may be selective used as input for calculating the result of said cell group. A "corresponding element of the array" of a cell as used herein is an array cell being mapped to a cell diagonal comprising said cell. Only the intermediate scores of a subset of cells of the cellblocks which are actually needed may be used, such that the data traffic between the global memory and the local memory is reduced.

In a further aspect a computer-readable non-transitory storage medium is provided comprising instructions which when executed by a processor cause the processor to execute the blocks of any one of the embodiments described above. In a further aspect, embodiments relate to a computer system comprising a processor; a global memory having stored therein a result container data structure h and a mapping; and a computer-readable non-transitory storage medium comprising instructions, wherein the processing unit executing the instructions is adapted for solving a dynamic programming problem. The processor executing the instructions may be adapted for representing the dynamic programming problem as a matrix F of cells, each cell representing an intermediate score to be calculated, the matrix having the form $F(i, j)=G(F(i-1, j-1), F(i, j-1), F(i-1, j), c(i,j))$, wherein i is a row index of the matrix F, wherein j is a column index of the matrix F, i and j respectively being larger than or equal to 0, wherein G is an optimization function and c is a cost function; providing the mapping, the mapping assigning cells of the matrix to elements of the result container data structure; providing the result container data structure h for storing cells of the matrix F to elements of the result container data structure in accordance with the mapping; calculating intermediate scores of all cells $F(i,j)$ of the matrix, whereby intermediate scores of some of the cells of the matrix are stored to a respectively assigned element of the result container data structure in accordance with the mapping; during the calculation of the intermediate scores, dynamically updating the assignment of cells and elements in the mapping in a way ensuring: that first ones of the cells of the matrix are assigned to elements of the result container data structure respectively not having stored any intermediate score or having stored an intermediate score of second ones of the cells of the matrix, the first cells being calculated at a later moment in time than the second cells, and that any intermediate scores of the second cells being overwritten by the intermediate scores of the first cells will not be required as input by any other ones of the matrix cells not having been calculated yet, wherein the number of elements of the data structure is smaller than the number of cells of the matrix; assembling a final result of the dynamic programming problem from the intermediate scores stored in the result container data structure.

In a further aspect, a computer-system is provided comprising: a first processing unit; a plurality of second processing units, each of the second processing units having assigned a respective local memory; a global memory being accessible by any of second the processing units; wherein the first processing unit is adapted for: solving a dynamic programming problem being representable as a matrix F of cells, each cell representing an intermediate score to be calculated, the matrix having the form $F(i,j)=G(F(i-1, j-1), F(i, j-1), F(i-1, j), c(i,j))$, wherein i is a row index of the matrix F, wherein j is a column index of the matrix F, I and j respectively being equal than or larger than 0, wherein the row index is incremented from top to bottom of the matrix and wherein the column index is incremented from the left to the right side of the matrix, wherein G is an optimization function and wherein c is a cost function; specifying a constant S; dividing all cells of the matrix into a grid g(y, x) of non-overlapping, adjacent cell groups, wherein each cell group g(y,x) comprises a left upper starting cell F(i,j) and is specifiable by a set of blocks comprising: selecting a cell F(i,j) of the matrix as the left upper starting cell of said cell group; selecting all cells of row i lying within the matrix and having a column index j within the range $[j-a+0, j-a+1, \ldots, j-a+(S-1)]$ to get S cells, wherein a=0; repeating block b), wherein in each repeat the row index i is incremented by 1 and wherein a is incremented by 1, said repeat being executed until a is equal to 5-1, thereby selecting S cells in each of S rows for said cell group altogether; wherein the left upper starting cell of at least one of the cell groups has row index i=0 and column index j=0, and wherein each of the matrix cells belongs to exactly one cell group of the grid of cell groups; assigning each of the cell groups to one of the second processing units;

Each of the second processing units is adapted for executing one of the cell groups concurrently, thereby filling each cell of said cell group with a calculated intermediate score. The execution of the plurality of cell groups is coordinated in a way ensuring that the execution of any of the cell groups is started only in case an execution of an adjacent left cell group and an adjacent upper cell group is already finished or if said adjacent left cell group or adjacent upper cell group does not exist. The central processing unit is further adapted for storing, upon the calculation of a result of the execution of any of the cell groups, said result to a result container data structure, the result container data structure being stored in the global memory. The central processing unit is also adapted for providing the results of each of the cell groups for assembling a final result of the dynamic programming problem. According to some embodiments, the first processing unit is a central processing unit and each of the second processing units is a stream multiprocessor of a graphical processing unit (GPU). The GPU comprises the global memory. Each of the local memories is a shared memory unit of one of the stream multiprocessors. The threads to be executed by the same processing unit share the same one of the shared memory units.

In a further aspect, a computer-implemented method is provided for solving a dynamic programming problem that is representable as a matrix F of cells. Each cell represents an intermediate score to be calculated. The matrix has the form $F(i,j)=G(F(i-1, j-1), F(i, j-1), F(i-1, j), c(i,j))$, wherein i is a row index of the matrix F, wherein j is a column index of the matrix F, i and j respectively being larger than or equal to 0. The row index is incremented from top to bottom of the matrix and the column index is incremented from the left to the right side of the matrix. G is an optimization function and c is a cost function. According to some embodiments, the computer-implemented method comprises: dividing all cells of the matrix into cell groups; executing, by each of the processing units, one of the cell groups concurrently, thereby filling each cell of said cell group with a calculated intermediate score, wherein for execution of each of the cell groups intermediate scores stored in a specific elements of a result container data structure h are read and used as input; wherein the execution of the cell groups is coordinated in a way ensuring that the execution of any of the cell groups is started only in case an execution of an adjacent left cell group and an adjacent upper cell group is already finished or if said adjacent left cell group or adjacent upper cell group does not exist; upon having calculated a result of the execution of any of the cell groups, storing said result to the specific elements of the result container data structure from which the input for said cell group was read, the result container data structure being stored in a global memory, the global memory being accessible by any one of the processing units; providing the results of each of the cell groups for assembling a final result of the dynamic programming problem.

The expression 'storing a cell F(i,j)' as used herein refers to storing an intermediate score of the dynamic programming problem having been calculated for said cell F(i,j). The features of the above method, computer-readable storage medium and computer system may be preferably combined with the features of any one of the embodiments of the computer-implemented method given above. The features of the above method may be advantageous as the same part of the result container data structure comprises the input data for a particular cell group and is also used for storing the result calculated when executing said cell group. Thus, intermediate scores not used any more are dynamically overwritten, thereby saving storage space and allowing to use a result container data structure of linear size. Thus, more complex dynamic programming problems making use of larger matrices can be solved even with limited memory resources. According to some embodiments, storing the result of a cell group into the specific elements of the result container data structure comprises: storing the collected intermediate score of each cell of a set of cells comprising the result of the execution of the cell group in one of the array elements, wherein said element is an array element being assigned to the cell diagonal identified to comprise the cell the respective intermediate score was collected from.

According to some embodiments the cell groups consist of a grid g(y, x) of non-overlapping, adjacent cell groups, wherein each cell group g(y,x) comprises a left upper starting cell F(i,j), the method further comprising specifying a constant S. Each of the cell groups is specifiable by a set of blocks comprising: selecting a cell F(i,j) of the matrix as the left upper starting cell of said cell group; selecting all cells of row i lying within the matrix and having a column index j within the range $[j-a+0, j-a+1, \ldots, j-a+(S-1)]$ to get S cells, wherein a=0; repeating block b), wherein in each repeat the row index i is incremented by 1 and wherein a is incremented by 1, said repeat being executed until a is equal to S−1, thereby selecting S cells in each of S rows for said cell group altogether. The left upper starting cell of at least one of the cell groups has row index i=0 and column index j=0. Each of the matrix cells belongs to exactly one cell group of the grid of cell groups. Then, each of the cell groups is assigned to one of a plurality of processing units.

In a further aspect, a computer-readable non-transitory storage medium is provided comprising instructions which when executed by a processor cause the processor to execute the blocks of any one of the embodiments described above. According to further embodiments computer-system is provided, comprising: a first processing unit; a plurality of second processing units, each of the second processing units having assigned a respective local memory; a global memory being accessible by any of second the processing units; wherein the first processing unit is adapted for: solving a dynamic programming problem being representable as a matrix F of cells, each cell representing an intermediate score to be calculated, the matrix having the form $F(i,j)=G(F(i-1, j-1), F(i, j-1), F(i-1, j), c(i,j))$, wherein i is a row index of the matrix F, wherein j is a column index of the matrix F, I and j respectively being equal than or larger than 0, wherein the row index is incremented from top to bottom of the matrix and wherein the column index is incremented from the left to the right side of the matrix, wherein G is an optimization function and wherein c is a cost function; dividing all cells of the matrix into cell groups; assigning each of the cell groups to one of the second processing units.

Each of the second processing units is adapted for executing one of the cell groups concurrently, thereby filling each cell of said cell group with a calculated intermediate score. For execution of each of the cell groups, intermediate scores stored in specific elements of a result container data structure are read and used as input. The execution of the cell groups is coordinated in a way ensuring that the execution of any of the cell groups is started only in case an execution of an adjacent left cell group and an adjacent upper cell group is already finished or if said adjacent left cell group or adjacent upper cell group does not exist. The central processing unit is further adapted for: upon the calculation of a result of the execution of any of the cell groups, storing said result to the specific elements of the result container data structure from which the input for said cell group was read, the result container data structure being stored in a global memory, the global memory being accessible by any one of the processing units; and for providing the results of each of the cell groups for assembling a final result of the dynamic programming problem.

Figure 2:
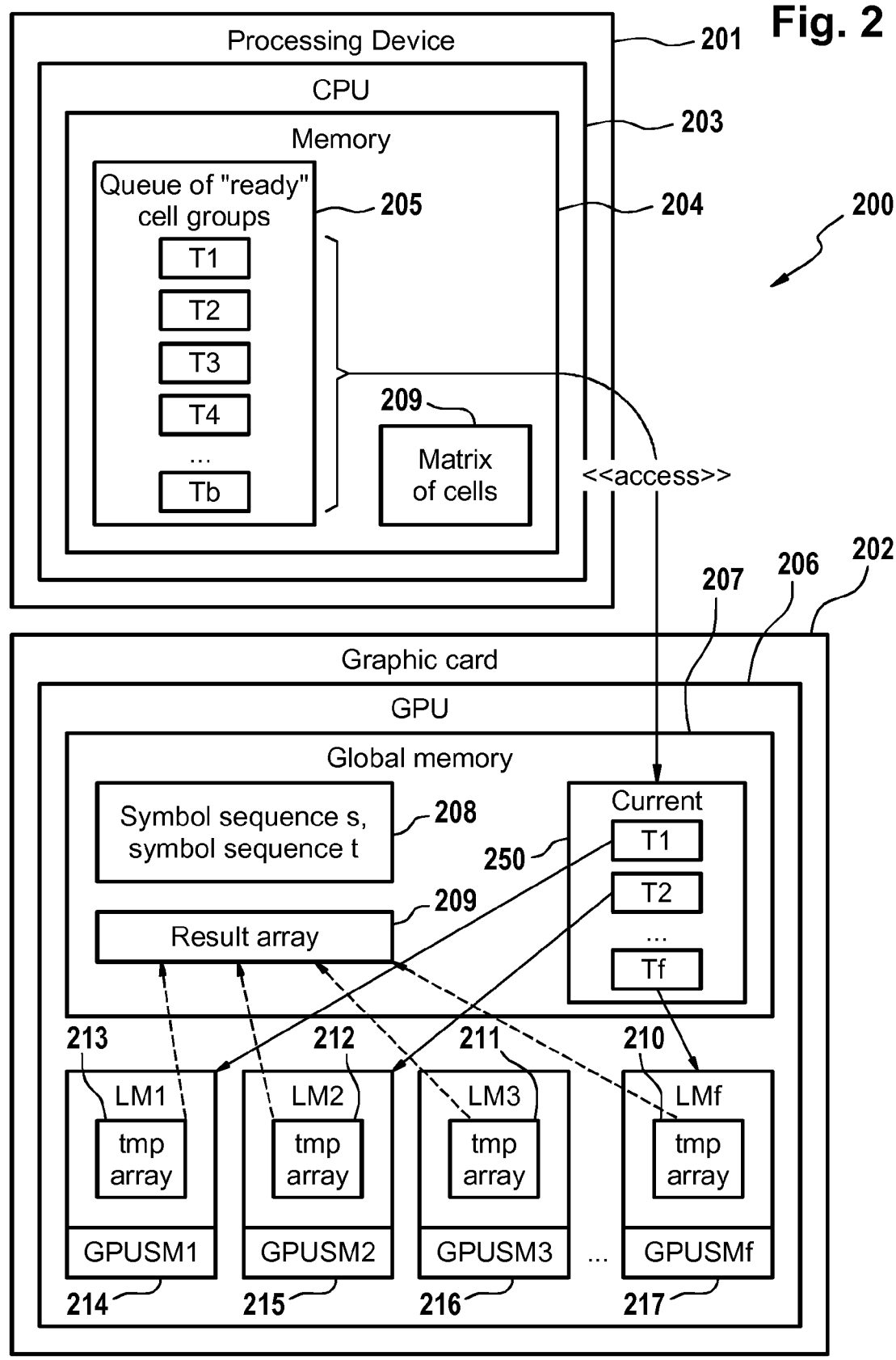
FIG. 2 is a block diagram illustrating an embodiment of a computer system having a first and a second processing device.
Figure 3:
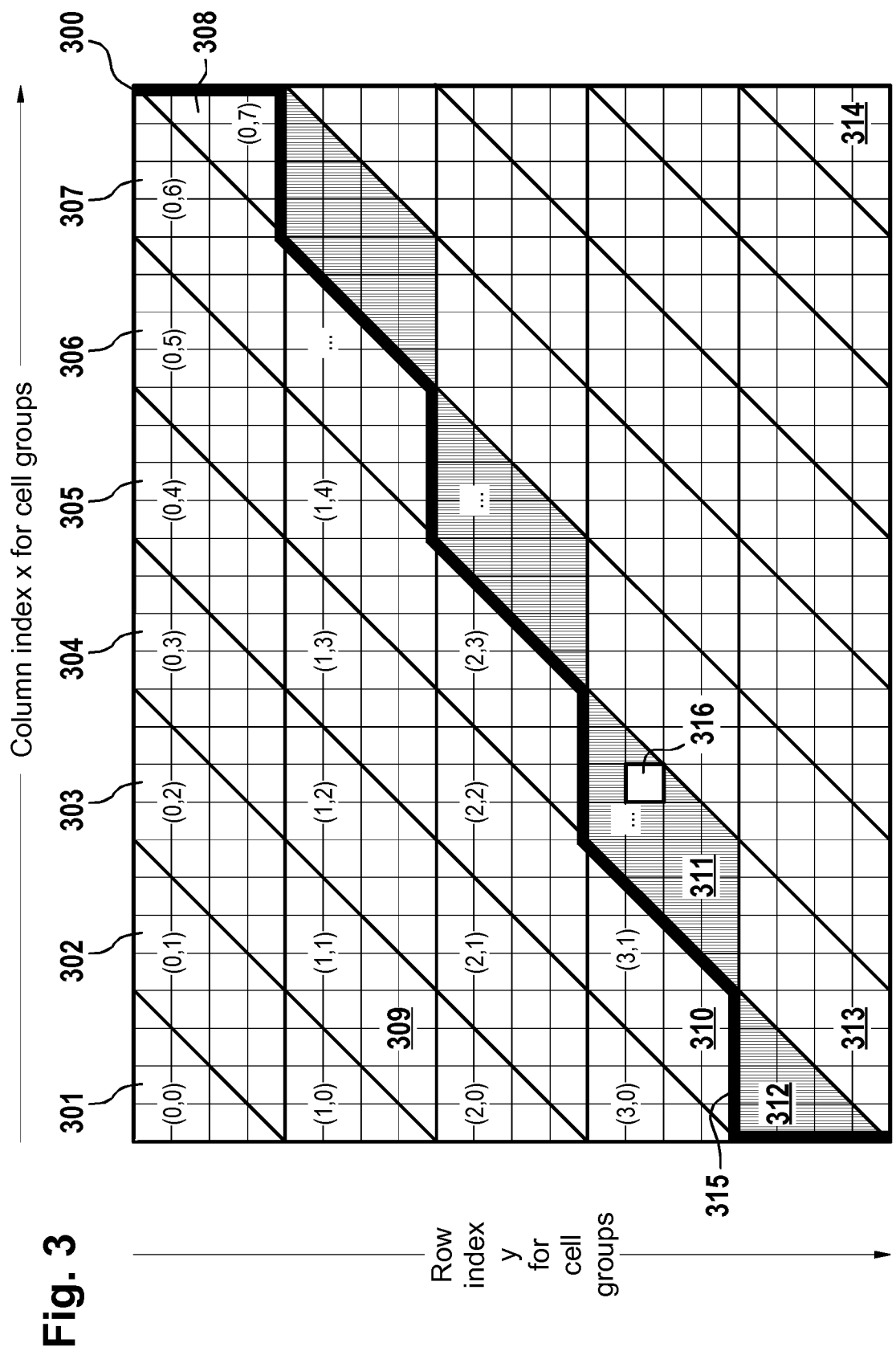
FIG. 3 illustrates an embodiment of a matrix of cells divided into cell groups.

FIG. 1 shows an embodiment of a flowchart of a method for solving a dynamic programming problem that is provided in block 101 to, for example, an application program running on a computer comprising a central processing unit (CPU). In block 102, a constant S is specified. Next, in block 103, the cells of the matrix are divided into a grid of non-overlapping, adjacent cell groups g(y,x) as depicted in FIG. 3 in greater detail. Then, in an assignment block 104, each of the ready cell groups is assigned to one of the plurality of processing units, for example, stream multiprocessors 214-217 of a graphic card 202 as depicted in FIG. 2 and which are discussed below. Then, in block 105, one of the cell groups is executed by each of the processing units, provided that all input data required by each of the cell groups is already available. Thus, multiple cell groups can be executed concurrently on the plurality of processing units. Then, in block 106, upon having calculated a result for any one of the cell groups, said result is stored to a result container data structure being stored in a global memory 207. Blocks 104-106 are repeated until the horizon reaches the lower-right corner cell, at which point the results of each of the cell groups are provided to assemble a final result of the dynamic programming problem in block 107.

FIG. 2 shows a computer system 200 comprising a processing device 201 comprising a CPU and a memory 204. The memory 204 comprises a FIFO queue comprising at each point in time a plurality of processing tasks T1-Tb. Each of said tasks corresponds to the task of executing a cell group, i.e., executing on cells within said group by one of the processing units 214-217 having been assigned to that task. The cells belong to a matrix of cells 209 being, according to the depicted embodiment, also stored in memory 204. The processing device 201 may be connected to the other processing device 202, in this case, a graphic card, via a system-internal bus connection. According to embodiments wherein the computer system 200 comprises a plurality of client computer systems (not shown) instead of a graphic card 202, the global memory 207 is part of the central processing device 201 or is operatively coupled to the central processing device. Said global memory would be accessible by each of the client computer systems respectively comprising a multicore processor and respectively comprising a local memory.

FIG. 2 shows an embodiment wherein each of the multiple processing units is a stream multiprocessor GPUSM1-GPUSMf of a graphical processing unit 206. Each of the local memories is a shared memory unit LM1, . . . , LMf of one of the stream multiprocessors. The GPU 206 of the graphic card 202 comprises a global memory for storing a result container data structure 209. The global memory also comprises the symbol sequences 208 s and t to be aligned. The global memory further comprises a current data structure 250 for storing as many tasks T1-Tf and corresponding cell groups as processing units 214-217 exist in the GPU 206. Each of the tasks T1-Tf corresponds to one cell group and comprises the task of executing said cell group. The CPU having access to the memory 204 comprising the FIFO queue and also having access to the global memory comprising the current data structure 250 is operable to copy one or more of the cell groups to the current data structure for concurrent execution. The stream multiprocessors 214-217, when calculating a cell group, read the required values from GPU's matrix of cells 209. This is indicated by the solid arrows originating from the task boxes of the current data structure 250. Each cell group is distributed from the current data structure to its respectively assigned processing units 215-217. For example, the cell group to be executed in tasks T1 is assigned to processing units 214. The intermediate scores of each cell of said cell group are stored in a temporary array 213 of the local memory LM1 of the processing units currently executing the cell group. After having calculated all intermediate scores for each cell of said cell group, a subset of said intermediate scores is selected and copied as the result of said cell group into corresponding array elements of the results contain a data structure 209. A 'corresponding array element' is an array element having assigned a particular cell diagonal covering a cell whose intermediate score is part of the result of the cell group. This copying is indicated by the dotted arrows originating from the local memories LM1-LMf.

FIG. 3 shows a matrix 300 of cells 316, the cells being grouped into cell groups 301-314. Cell group (0, 0) is a triangle-shaped starting cell, cell group (0,7) is a "end" cell group. The cell groups 302-307 are diamond-shaped cell groups characterized by a column index x and a row index y. The thick line 315 originating in the lowest left cell and in the uppermost right cell of the matrix indicates a horizon of cells. The cell groups 312, 311 and the other two cell groups indicated with hatching are cell groups which are ready for execution.

Figure 4B:
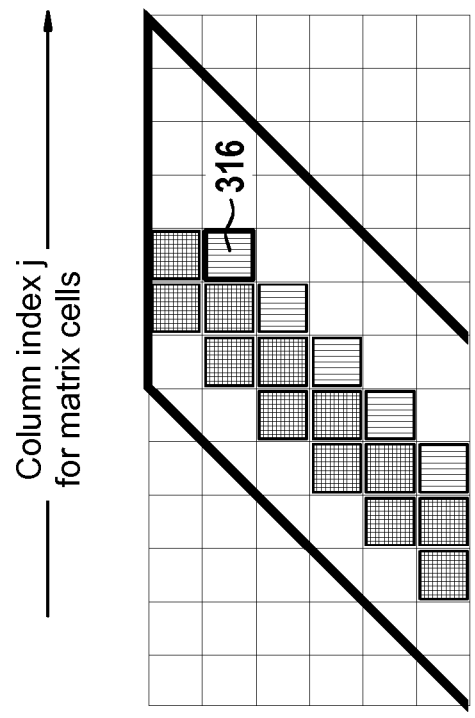
FIG. 4a and FIG. 4b illustrate an embodiment of a horizon-segment migrating one block forward.
Figure 4A:
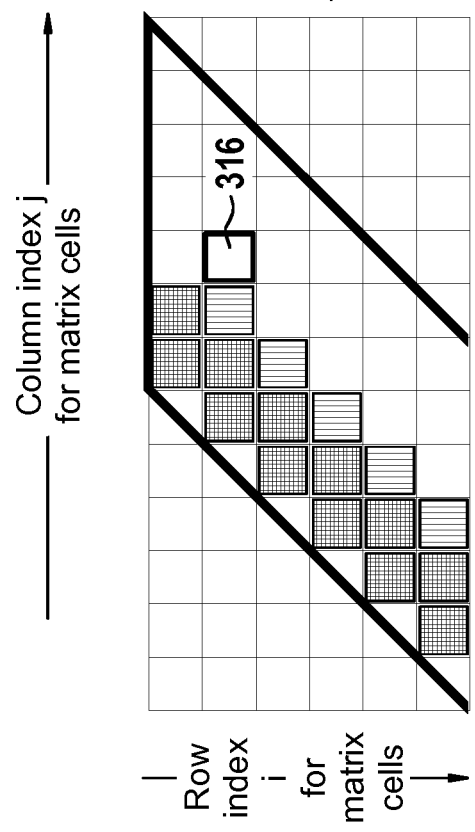

FIGS. 4*a*-*b* shows the execution of cell group 311 in greater detail. Each of the cells marked by light vertical-line hatching use the intermediate scores having been calculated for the left, left upper and upper neighbor cell (indicated by grid hatching) as input. Cell 316, for example, is ready for execution in FIG. 4*b*, but not in FIG. 4*a*.

Figure 5:
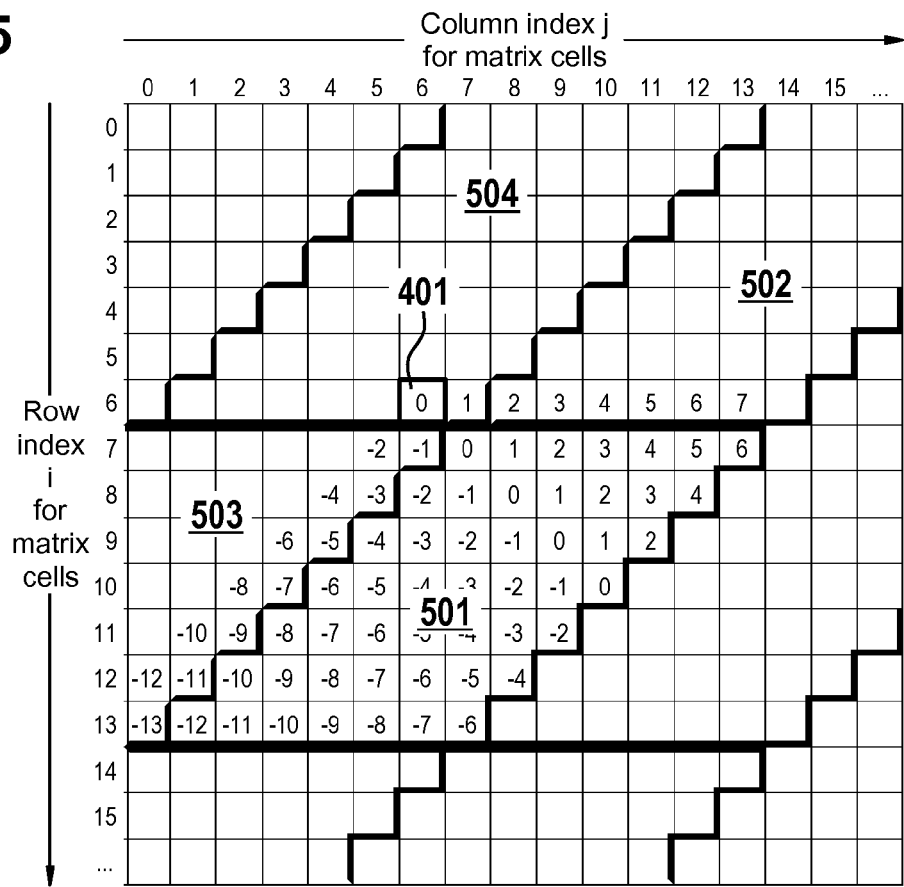
FIG. 5 illustrates an embodiment of execution of a cell group.

FIG. 5 shows the execution of a cell group in greater detail. The cell group 501 takes some intermediate scores provided by its neighbor cell groups 503, 504 and 502 as input. After having calculated all the cells in the cell group 501, selectively the intermediate score values [−12, . . . , −6] of the lowest cell row of cell group 501 and the two intermediate scores of the two rightmost cells in each row of cell group [(5,6), (3,4), (1,2), (−1,0), (−3,−2), (−5,−4), (−7,−6)] are returned as the result of cell group 501 and stored in the results container data structure. All the cells on a given anti-diagonal are executed concurrently. The threads for calculating the individual cells are synchronized only after they finish working on an anti-diagonal. It is not necessary to synchronize the threads between the different cell groups as the cell groups are distributed to different processing units which are independent of each other. In order to update the dependencies between different cellblocks/processing units, it is monitored which of the cell groups has finished execution. According to embodiments, the monitoring of the readiness (the ability to start executing as all inputs data required is available) of the cell groups comprises: the left-most, uppermost "start" cell group is considered as ready per default; if the cell group is a "start" cell group, the upper neighboring cell group must be completed before it; if the cell group is an "end" cell group, the left neighboring cell group must be completed before it; all other cell groups are considered as ready for execution if their respective left neighboring cell group and upper neighboring cell group has completed. The even distribution of cells to the cell groups is advantageous as said feature allows to easily keep track of the readiness of the individual cell groups, as all dependencies between the groups are clear.

Figure 6:
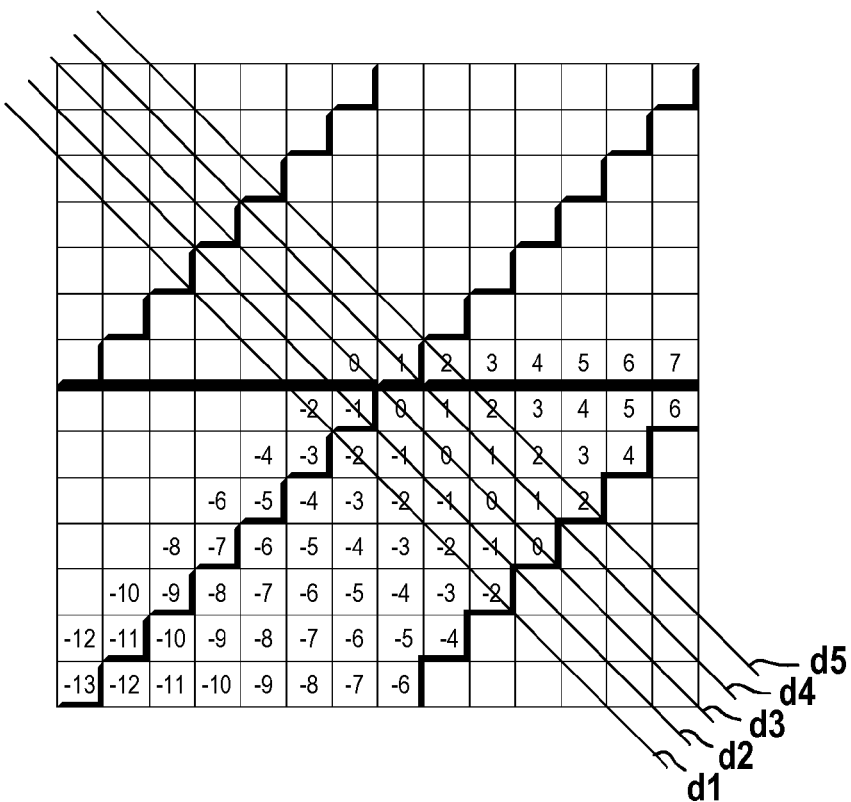
FIG. 6 illustrates an embodiment of division into diagonals.

FIG. 6 shows a group of cell diagonals d1-d5 respectively covering a set of cells. For example, cell diagonal d3 (i−i=0) covers cells F(0,0), F(1,1), F(2,2) . . . while cell diagonal d4 (i−i=-1) covers cells F(0,1), F(1,2), F(2,3), . . . .

FIGS. 7*a*-*c* shows an example of a cell of matrix F being used for aligning DNA sequences. FIG. 7*a* depicts two cells ready for execution and one cell in the left upper corner having already been executed. In FIG. 7*b*, the algorithm has proceeded one block further. Three cells are ready for execution, three having already been calculated. FIG. 7*c* shows the situation when the "start" cell group has completed calculation. Only the filled-in intermediate values indicated in said cell group are returned as the result of that cell group and are stored in an array cells in dependence on their respective cell diagonal.

FIG. 8*a* depicts a migrating horizon, the horizon comprising cells used as input for or the cells to be calculated in the following blocks. FIG. 8*b* shows two cell groups in hatching which can be computed on different processing units as they are not dependent from each other. FIG. 8*c* shows the position of the horizon after having finished calculating the cell groups hachured in FIG. 8*b*.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational blocks to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing has been with reference to particular embodiments of the invention, it will be appreciated by those skilled in the art that changes in these embodiments may be made without departing from the principles and spirit of the invention, the scope of which is defined by the appended claims.

The technical effects and benefits of exemplary embodiments include efficient use of processing resources to solve a dynamic programming problem.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, blocks, operations, elements, and/or components, but do not preclude the presence or addition of one or more other features, integers, blocks, operations, elements, components, and/or groups thereof.

The corresponding structures, materials, acts, and equivalents of all means or block plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for solving a dynamic programming problem, the method comprising:

receiving the dynamic programming problem by a computer system comprising a plurality of processing units, each of the plurality of processing units having a respective assigned local memory;

representing the dynamic programming problem as a matrix F of cells, each cell representing an intermediate score to be calculated, the matrix having a form:

$$F(i,j)=G(F(i-1,j-1), F(i,j-1), F(i-1,j), c(i,j)),$$

wherein i is a row index of the matrix F, wherein j is a column index of the matrix F, i and j respectively being larger than or equal to 0, wherein G is an optimization function and c is a cost function;

providing a mapping, the mapping assigning cells of the matrix to elements of a result container data structure;

providing the result container data structure for storing cells of the matrix F to elements of the result container data structure in accordance with the mapping;

calculating intermediate scores of all cells $F(i,j)$ of the matrix, whereby intermediate scores of some of the cells of the matrix are stored to a respectively assigned element of the result container data structure in accordance with the mapping by dividing all cells of the matrix into cell groups, and executing one of the cell groups concurrently, wherein each of the plurality of processing units uses the processing unit's assigned local memory for the executing;

during the calculation of the intermediate scores by each of the plurality of processing units, dynamically updating the assignment of cells and elements in the mapping such that:

that first cells of the matrix are assigned to elements of the result container data structure respectively not having stored any intermediate score or having stored an intermediate score of second cells of the matrix, the first cells being calculated at a later moment in time than the second cells;

any intermediate scores of the second cells are overwritten by the intermediate scores of the first cells will not be required as input by any other ones of the matrix cells not having been calculated yet; and the number of elements of the data structure is smaller than the number of cells of the matrix; and assembling a final result of the dynamic programming problem from the intermediate scores stored in the result container data structure, the result container data structure being stored in a global memory that is accessible by each of the plurality of processing units.

2. The method of claim 1, wherein calculating the intermediate scores comprises:

wherein executing, by each of the plurality of processing units, one of the cell groups concurrently, fills each cell of said cell groups with a calculated intermediate score, wherein for execution of each of the cell group's intermediate scores stored in specific elements of the result container data structure are read and used as input;

wherein the execution of the cell groups is coordinated in a way ensuring that the execution of any of the cell groups is started only in case an execution of an adjacent left cell group and an adjacent upper cell group is already finished or if said adjacent left cell group or adjacent upper cell group does not exist;

upon having calculated a result of the execution of any of the cell groups, storing said result to the specific elements of the result container data structure from which the input for said cell groups was read, the result container data structure being stored in a global memory, the global memory being accessible by any one of the processing units; and providing the results of each of the cell groups for assembling the final result of the dynamic programming problem.

3. The method of claim 2, wherein executing each of the cell groups respectively comprises:

assigning each cell of a cell group to one thread to be executed by the processing unit that is assigned said cell group, wherein all threads executed by said processing unit are operable to access the local memory assigned to said processing unit;

executing, by each of said threads, one of the cells of said cell group, wherein the execution of the plurality of cells is coordinated in a way ensuring that the execution of any of the cells is started only in case an execution of an adjacent left cell, an adjacent left-upper cell and an adjacent upper cell is already finished or if said adjacent left cell, adjacent left-upper cell or adjacent upper cell lies outside the matrix; and based on calculating a result of the execution of any of the cells of said cell group, storing said result as the intermediate score of said cell to the local memory of said processing unit.

4. The method of claim 2, further comprising:

collecting, for each of the cell groups having finished execution, all intermediate scores stored in any of the following set of cells:
all cells of the lower-most row of a cell group; and
the two cells in each row of said cell group having the highest column index;

identifying, for each cell of said set of cells, a cell diagonal, said cell diagonal comprising said cell; and using the collected intermediate scores as the result of the execution of said cell group.

5. The method of claim 4, wherein storing the result of a cell group into the specific elements of the result container data structure comprises:

storing the collected intermediate scores respectively in one of the elements of the result container data structure, wherein each element of the result container data structure is assigned to the cell diagonal identified to comprise the cell the respective intermediate score was collected from.

6. The method of claim 5, wherein upon starting the execution of a current one of the cell groups the method further comprises:

reading first intermediate scores calculated for the collected cells of a left-adjacent cell group of said current cell group, the first intermediate scores being read from the corresponding elements of an array;

reading second intermediate scores calculated for the collected cells of an upper-adjacent cell group of said current cell group, the second intermediate scores being read from the corresponding elements of the array;

reading third intermediate scores calculated for the collected cells of an upper-left-adjacent cell group of said current cell group, the third intermediate scores being read from the corresponding elements of the array; and using selectively the first, second and third intermediate scores as input for calculating the result of said cell group.

7. The method of claim 6, wherein the dynamic programming problem relates to an alignment of a first sequence of symbols s and a second sequence of symbols t, the first sequence being of length N, the second sequence being of length M, wherein S is a number smaller or equal than N; wherein S is a number smaller or equal than M, the method further comprising:

determining if the length N is dividable by S without leaving a reminder;

if N is not dividable, adding as many of a fill-symbol at an end of the first sequence as necessary in order to make the length N' of the first sequence dividable by S;

determining if the length M is dividable by S without leaving a reminder;

if M is not dividable, adding as many of a fill-symbol at an end of the second sequence as necessary in order to make the length M' of the second sequence dividable by S; and specifying one or more alignment scores to be returned as a result of the cost function c(i,j) when aligning a first symbol s[i] and a second symbol t[j], said one or more alignment scores being chosen such that the final result is guaranteed to comprise an alignment of the first and the second sequence having no mismatches of the fill-symbols with one of the other symbols.

8. The method of claim 7, wherein the coordination of the execution of the cell groups comprises:

adding the top- and left-most cell group g(0,0) to a first-in-first-out (FIFO) queue;

executing the top- and left-most cell group;

monitoring, while any of the cell groups is executed, which one of the cell groups is ready for starting the execution, wherein a cell group is ready for execution if said cell group has not been executed yet and if in addition the execution of the adjacent left cell group and the adjacent upper cell group is already finished or if said adjacent left cell group or adjacent upper cell group does not exist; and upon determining that any of the cell groups is ready for execution, adding said cell group to the FIFO queue.

9. The method of claim 8, wherein the execution of the cell groups comprises:

determining a number of processing units;

determining a sub-set of cell groups in the FIFO queue which are to be executed next, said sub-set comprising as many cell groups as the number of processing units or, if the number of cell groups ready to be started execution lies below the number of processing units, comprising all of the cell groups ready to be executed;

storing a copy of said sub-set of cell groups into the global memory; and copying each of the cell groups in said sub-set from the global memory into the local memory of one of the processing units for parallel execution of all cell groups of said sub-set.

10. The method of claim 9, further comprising:

determining a local memory size, the local memory size being the minimum size of any of the local memories;

dividing the local memory size by a factor of 3 times cell memory size for obtaining a division result, wherein the cell memory size is the storage space required for storing one of the intermediate scores in one of the cells of the matrix; and rounding the division result down to a nearest whole value and using said nearest whole value as S.

11. The method of claim 1, wherein the result container data structure comprising a memory structure having a size being proportional to a sum of the number of columns and the number of rows in the matrix F.

12. The method claim 1, wherein the elements of the result container data structure are identified by at least one index.

13. The method of claim 1, wherein the result container data structure comprises an array.

14. The method of claim 1, wherein the result container data structure comprises N+M−1 elements, wherein N is the number of rows of the matrix, wherein M is the number of columns of the matrix.

15. The method of claim 1, wherein each of the elements is invariantly mapped to one of one or more cell diagonals spanning the matrix F, wherein each cell diagonal is a set of one or more matrix cells, wherein all cells of said cell diagonal fulfill an equation i−j=constant, said constant being particular for said cell diagonal, and wherein by repeatedly updating the assignment of cells and elements in the mapping, all cells of a cell diagonal are consecutively mapped to the same element of the result container data structure.

16. The method of claim 1, wherein intermediate scores of all cells in a current set of horizon cells are stored in the result container data structure, wherein the current set of horizon cells is defined as a set of neighboring cells of matrix F meeting the following conditions:
the upper-right corner cell and the lower-left corner cell of the matrix are included;
intermediate scores have been calculated for the current set of horizon cells, for all cells of the matrix F having a lower or equal row index value and/or a lower or equal column index value than any cell of the current set of horizon of cells; and
intermediate scores have not yet been calculated for the lower right cell of each horizon cell.

17. The method claim 1, wherein cells F(i,j) of the matrix F are stored in the result container data structure in the following manner: h [i−j]=F(i,j), wherein h [i−j] is mapped to exactly one cell diagonal covering at least the cell F(i,j).

18. The method of claim 1, wherein the row index is incremented from top to bottom of the matrix and the column index is incremented from the left to the right side of the matrix, wherein the cell groups consist of a grid g(y, x) of non-overlapping, adjacent cell groups, wherein each cell group g(y,x) comprises a left upper starting cell F(i,j), the method further comprising
specifying a constant S, wherein each of the cell groups is specifiable by:
selecting a cell F(i,j) of the matrix as the left upper starting cell of said cell group;
selecting all cells of row i lying within the matrix and having a column index j within the range [j−a+0, j−a+1, . . . , j−a+(S−1)] to get S cells, wherein a=0; and
repeating the selecting s cell F(i,j), wherein in each repeat the row index i is incremented by 1 and wherein a is incremented by 1, said repeat being executed until a is equal to S−1, thereby selecting S cells in each of S rows for said cell group altogether;
wherein the left upper starting cell of at least one of the cell groups has row index i=0 and column index j=0, and wherein each of the matrix cells belongs to exactly one cell group of the grid of cell groups; and wherein each of the cell groups is assigned to one of the plurality of processing units.

19. A computer program product for solving a dynamic programming problem, the computer program product comprising a computer readable storage medium having computer readable program code embodied therewith, the computer readable program code comprising computer readable program code configured to:
receive the dynamic programming problem by a computer system comprising a plurality of processing units, each of the plurality of processing units having a respective assigned local memory;
represent the dynamic programming problem as a matrix F of cells, each cell representing an intermediate score to be calculated, the matrix having a form:

$$F(i,j)=G(F(i-1,j-1),F(i,j-1),F(i-1,j),c(i,j)),$$

wherein i is a row index of the matrix F, wherein j is a column index of the matrix F, i and j respectively being larger than or equal to 0, wherein G is an optimization function and c is a cost function;
provide a mapping, the mapping assigning cells of the matrix to elements of a result container data structure;
provide the result container data structure for storing cells of the matrix F to elements of the result container data structure in accordance with the mapping;
calculate intermediate scores of all cells F(i,j) of the matrix, whereby intermediate scores of some of the cells of the matrix are stored to a respectively assigned element of the result container data structure in accordance with the mapping by dividing all cells of the matrix into cell groups, and executing one of the cell groups concurrently, wherein each of the plurality of processing units uses the processing unit's assigned local memory for the executing;
during the calculation of the intermediate scores by each of the plurality of processing units, dynamically updating the assignment of cells and elements in the mapping such that:
that first cells of the matrix are assigned to elements of the result container data structure respectively not having stored any intermediate score or having stored an intermediate score of second cells of the matrix, the first cells being calculated at a later moment in time than the second cells;
any intermediate scores of the second cells are overwritten by the intermediate scores of the first cells will not be required as input by any other ones of the matrix cells not having been calculated yet; and
the number of elements of the data structure is smaller than the number of cells of the matrix; and
assemble a final result of the dynamic programming problem from the intermediate scores stored in the result container data structure, the result container data structure being stored in a global memory that is accessible by each of the plurality of processing units.

20. A computer system comprising:
a plurality of processing units, each of the plurality of processing units having a respective assigned local memory;
a global memory having stored therein a result container data structure and a mappingglobal memory being accessible by each of the plurality of processing units;
the computer system configured for:
receiving a dynamic programming problem by the computer system;
representing the dynamic programming problem as a matrix F of cells, each cell representing an intermediate score to be calculated, the matrix having a form:

$$F(i,j)=G(F(i-1,j-1),F(i,j-1),F(i-1,j),c(i,j)),$$

wherein i is a row index of the matrix F, wherein j is a column index of the matrix F, i and j respectively being larger than or equal to 0, wherein G is an optimization function and c is a cost function;

providing a mapping, the mapping assigning cells of the matrix to elements of a result container data structure;

providing the result container data structure for storing cells of the matrix F to elements of the result container data structure in accordance with the mapping;

calculating intermediate scores of all cells F(i,j) of the matrix, whereby intermediate scores of some of the cells of the matrix are stored to a respectively assigned element of the result container data structure in accordance with the mapping by dividing all cells of the matrix into cell groups, and executing one of the cell groups concurrently, wherein each of the plurality of processing units uses the processing unit's assigned local memory for the executing;

during the calculation of the intermediate scores by each of the plurality of processing units, dynamically updating the assignment of cells and elements in the mapping such that:

that first cells of the matrix are assigned to elements of the result container data structure respectively not having stored any intermediate score or having stored an intermediate score of second cells of the matrix, the first cells being calculated at a later moment in time than the second cells;

any intermediate scores of the second cells are overwritten by the intermediate scores of the first cells will not be required as input by any other ones of the matrix cells not having been calculated yet; and the number of elements of the data structure is smaller than the number of cells of the matrix; and assembling a final result of the dynamic programming problem from the intermediate scores stored in the result container data structure, the result container data structure being stored in the global memory that is accessible by each of the plurality of processing units.

21. A computer system comprising:
a first processing unit;
a plurality of second processing units, each of the second processing units having assigned a respective local memory;
a global memory being accessible by any of second the processing units;
wherein the first processing unit is adapted for solving a dynamic programming problem by:

representing the dynamic programming problem as a matrix F of cells, each cell representing an intermediate score to be calculated, the matrix having the form:

$$F(i,j)=G(F(i-1,j-1), F(i,j-1), F(i-1,j), c(i,j)),$$

wherein i is a row index of the matrix F, wherein j is a column index of the matrix F, i and j respectively being equal than or larger than 0, wherein the row index is incremented from top to bottom of the matrix and wherein the column index is incremented from the left to the right side of the matrix, wherein G is an optimization function and wherein c is a cost function;

specifying a constant S;

dividing all cells of the matrix into a grid g(y, x) of non-overlapping, adjacent cell groups, wherein each cell group g(y,x) comprises a left upper starting cell F(i,j) and is specifiable by:

selecting a cell F(i,j) of the matrix as the left upper starting cell of said cell group;

selecting all cells of row i lying within the matrix and having a column index j within the range [j−a+0, j−a+1, . . . , j−a+(S−1)] to get S cells, wherein a=0; and repeating the selecting a cell F(i,j), wherein in each repeat the row index i is incremented by 1 and wherein a is incremented by 1, said repeat being executed until a is equal to S−1, thereby selecting S cells in each of S rows for said cell group altogether;

wherein the left upper starting cell of at least one of the cell groups has row index i=0 and column index j=0, and wherein each of the matrix cells belongs to exactly one cell group of the grid of cell groups; and assigning each of the cell groups to one of the second processing units, wherein each of the second processing units is adapted for executing one of the cell groups concurrently, thereby filling each cell of said cell group with a calculated intermediate score, wherein the execution of the plurality of cell groups is coordinated in a way ensuring that the execution of any of the cell groups is started only in case an execution of an adjacent left cell group and an adjacent upper cell group is already finished or if said adjacent left cell group or adjacent upper cell group does not exist, and wherein the first processing unit is further adapted for:

storing, based on calculation of a result of the execution of any of the cell groups, said result to a result container data structure, the result container data structure being stored in the global memory; and providing the results of each of the cell groups for assembling a final result of the dynamic programming problem.

22. The computer system of claim 21, wherein the first processing unit is a central processing unit and wherein each of the second processing units is a stream multiprocessor of a graphical processing unit (GPU), the graphical processing unit comprising the global memory, wherein each of the local memories is a shared memory unit of one of the stream multiprocessors, wherein the threads to be executed by the same processing unit share the same one of the shared memory units.

23. The computer system of claim 21, wherein each of the processing units is a processor of a client computer system, each of the client computer systems being respectively connected to a central server, each client computer system comprising one of said local memory units, the central server comprising the global memory, the global memory being accessible by any of said client computer systems, wherein the threads to be executed by the same processing unit are threads to be executed by one of the client computer systems, each of the threads being operable to access the local memory of said client computer system.

24. A computer-implemented method for solving a dynamic programming problem, the method comprising:

representing the dynamic programming problem as a matrix F of cells, each cell representing an intermediate score to be calculated, the matrix having the form:

$$F(i,j)=G(F(i-1,j-1), F(i,j-1), F(i-1,j), c(i,j)),$$

wherein i is a row index of the matrix F, wherein j is a column index of the matrix F, i and j respectively being larger than or equal to 0, wherein the row index is incremented from top to bottom of the matrix and wherein the column index is incremented from the left to the right side of the matrix, wherein G is an optimization function and wherein c is a cost function;

specifying a constant S;

dividing all cells of the matrix into a grid $g(y, x)$ of non-overlapping, adjacent cell groups, wherein each cell group $g(y,x)$ comprises a left upper starting cell $F(i,j)$ and is specified by:

selecting a cell $F(i,j)$ of the matrix as the left upper starting cell of said cell group;

selecting all cells of row i lying within the matrix and having a column index j within the range $[j-a+0, j-a+1, \ldots, j-a+(S-1)]$ to get S cells, wherein $a=0$; and repeating the selecting a cell $F(i,j)$, wherein in each repeat the row index i is incremented by 1 and wherein a is incremented by 1, said repeat being executed until a is equal to S−1, thereby selecting S cells in each of S rows for said cell group altogether;

wherein the left upper starting cell of at least one of the cell groups has row index $i=0$ and column index $j=0$, and wherein each of the matrix cells belongs to exactly one cell group of the grid of cell groups; assigning each of the cell groups to one of a plurality of processing units;

executing, by each of the processing units, one of the cell groups concurrently, thereby filling each cell of said cell group with a calculated intermediate score, wherein the execution of the plurality of cell groups is coordinated in a way ensuring that the execution of any of the cell groups is started only in case an execution of an adjacent left cell group and an adjacent upper cell group is already finished or if said adjacent left cell group or adjacent upper cell group does not exist;

based on calculating a result of the execution of any of the cell groups, storing said result to a result container data structure, the result container data structure being stored in a global memory, the global memory being accessible by any one of the processing units; and providing the results of each of the cell groups for assembling a final result of the dynamic programming problem.

* * * * *